United States Patent [19]
Yang

[11] Patent Number: 5,243,731
[45] Date of Patent: Sep. 14, 1993

[54] AUTOMATIC SELF-CLEANING WINDSHIELD WIPER ASSEMBLY

[76] Inventor: Ming-Tung Yang, No. 4-3, Lane 97, Lung Chuan St., Panchiao, Taipei Hsien, Taiwan

[21] Appl. No.: 900,442

[22] Filed: Jun. 18, 1992

[51] Int. Cl.⁵ .............................. B60S 1/28; B60S 1/40
[52] U.S. Cl. ............................... 15/250.41; 15/250.42; 15/250.19; 15/250.33
[58] Field of Search ........... 15/250.33, 250.41, 250.36, 15/250.19, 250.22, 250.42, 250.02, 250.40, 250.04, 250.23

[56] References Cited

U.S. PATENT DOCUMENTS

| | | | |
|---|---|---|---|
| 2,025,888 | 12/1935 | Olivero | 15/250.30 |
| 2,787,803 | 4/1957 | Cella | 15/250.23 |
| 3,031,709 | 5/1962 | Easterling | 15/250.33 |
| 3,405,421 | 10/1968 | Tomlin | 15/250.33 |
| 3,631,561 | 1/1972 | Aszkenas | 15/250.41 |
| 4,698,874 | 10/1987 | Fritz, Jr. | 15/250.33 |

FOREIGN PATENT DOCUMENTS

| | | | |
|---|---|---|---|
| 1210495 | 9/1959 | France | 15/250.33 |
| 449635 | 7/1936 | United Kingdom | 15/250.33 |
| 725492 | 3/1955 | United Kingdom | 15/250.33 |

Primary Examiner—Harvey C. Hornsby
Assistant Examiner—Gary K. Graham
Attorney, Agent, or Firm—Bacon & Thomas

[57] ABSTRACT

A windshield wiper includes a pair of wiper blades pivotally secured to an H-shaped connecting seat which is in turn pivotally secured to a shaft carried by a wiper arm, with the connecting seat having a pair of cleaner strips positioned outwardly of the wiper blades for cleaning the blades prior to their alternating engagement against the windshield during the back and forth movement of the wiper arm.

1 Claim, 4 Drawing Sheets

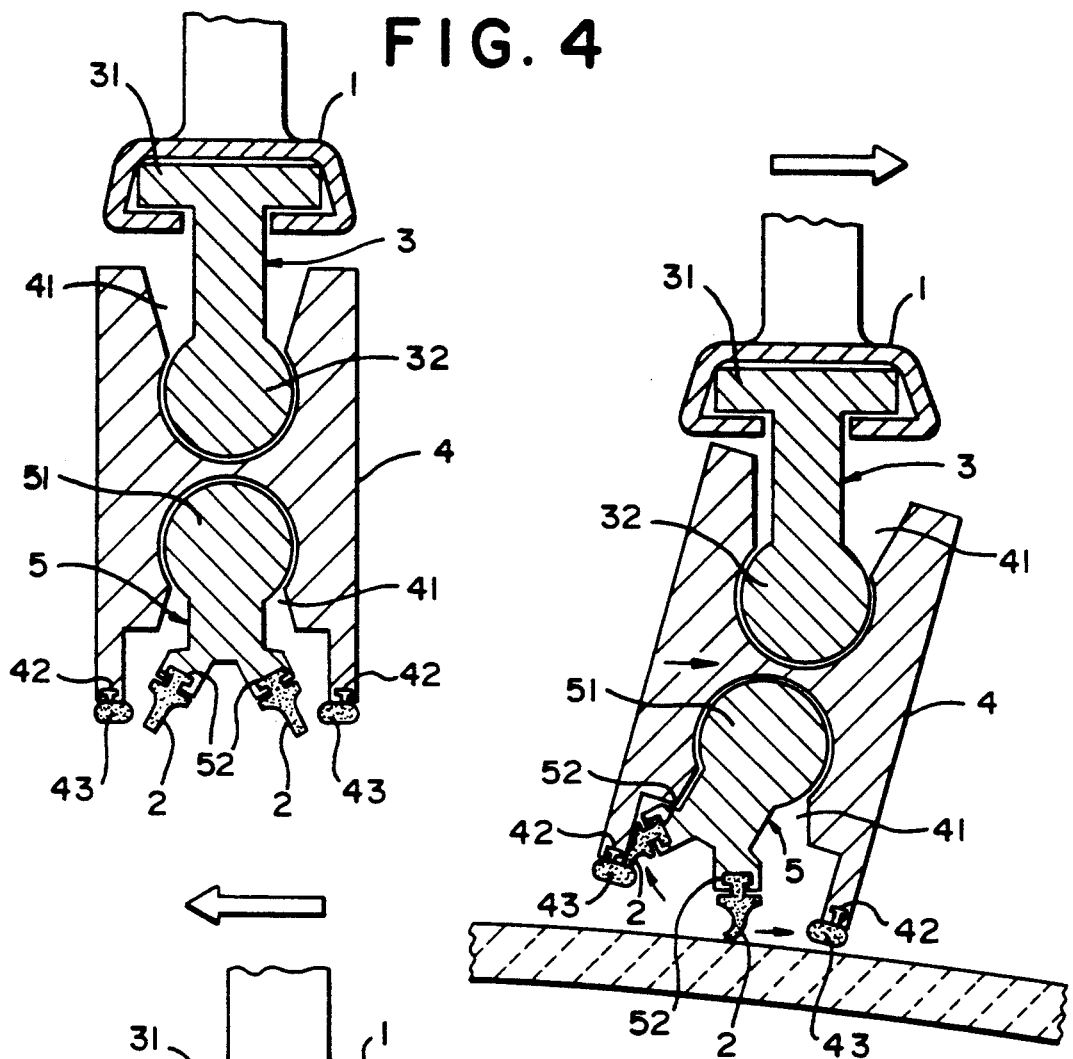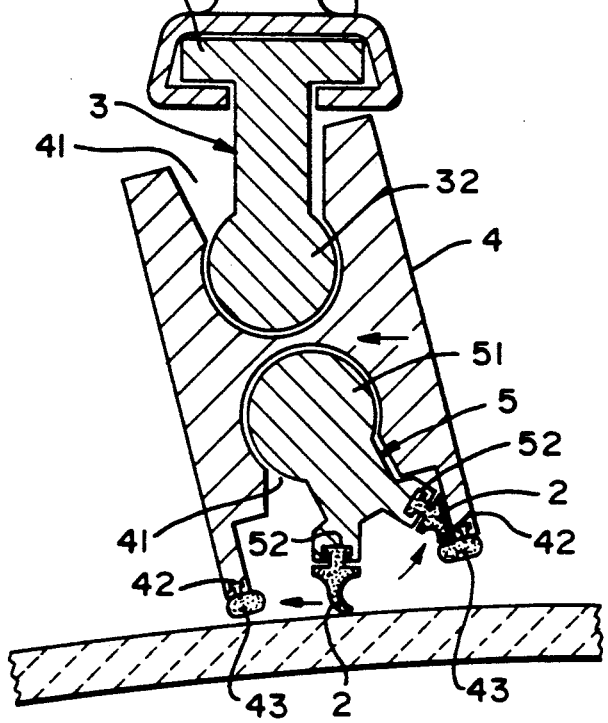

AUTOMATIC SELF-CLEANING WINDSHIELD WIPER ASSEMBLY

BACKGROUND OF THE INVENTION

A conventional windshield wiper is constituted by a wiper arm (1) and wiper blade (2) as illustrated in FIG. 1. Mostly, the wipers are exposed to the outdoors so that the wiper blades (2) will be stained with dust and dirt or even oily stains from the polluted air as the car is running or parked on the street. Consequently, as the car is running in the rain and the wiper is needed, the dust and stains may considerably decrease the wiping effect of the wiper. It is obvious that, no matter whether or not the wiper is in use, as long as it has been equipped on the car for a short period of time, proper wiping may not occur and put the driver at risk of having obscured vision as he drives. Some drivers may clean the wiper blade from time to time, while others may just replace with new wipers. Either way, there is undesirable waste of time or expense.

SUMMARY OF THE INVENTION

The present invention relates to an auto-cleansing wiper which is a double-blade wiper mechanism that can automatically alternate the blades in the wiping motion to achieve the best wiping effect. The auto-cleansing wiper of the present invention is constituted by a wiper arm and a distinctively designed automatic alternating device including a motivating shaft, a connecting seat, and a double-groove blade seat, which as in use the blade on one side of its double-blade wiper is brought up for cleansing while the other side is alternated to wipe the windshield.

BRIEF DESCRIPTION OF THE DRAWINGS

FIG. 2A is an enlarged perspective view of the end portion identified in FIG. 2.

FIG. 4 is a cross-sectional view showing the assembly of the present invention.

FIG. 5 is another cross-sectional view showing the present invention in the wiping motion.

FIG. 6 is a further cross-sectional view showing the alternated blade of the present invention wiping in another direction.

DETAILED DESCRIPTION OF THE PRESENT INVENTION

Figure 1:
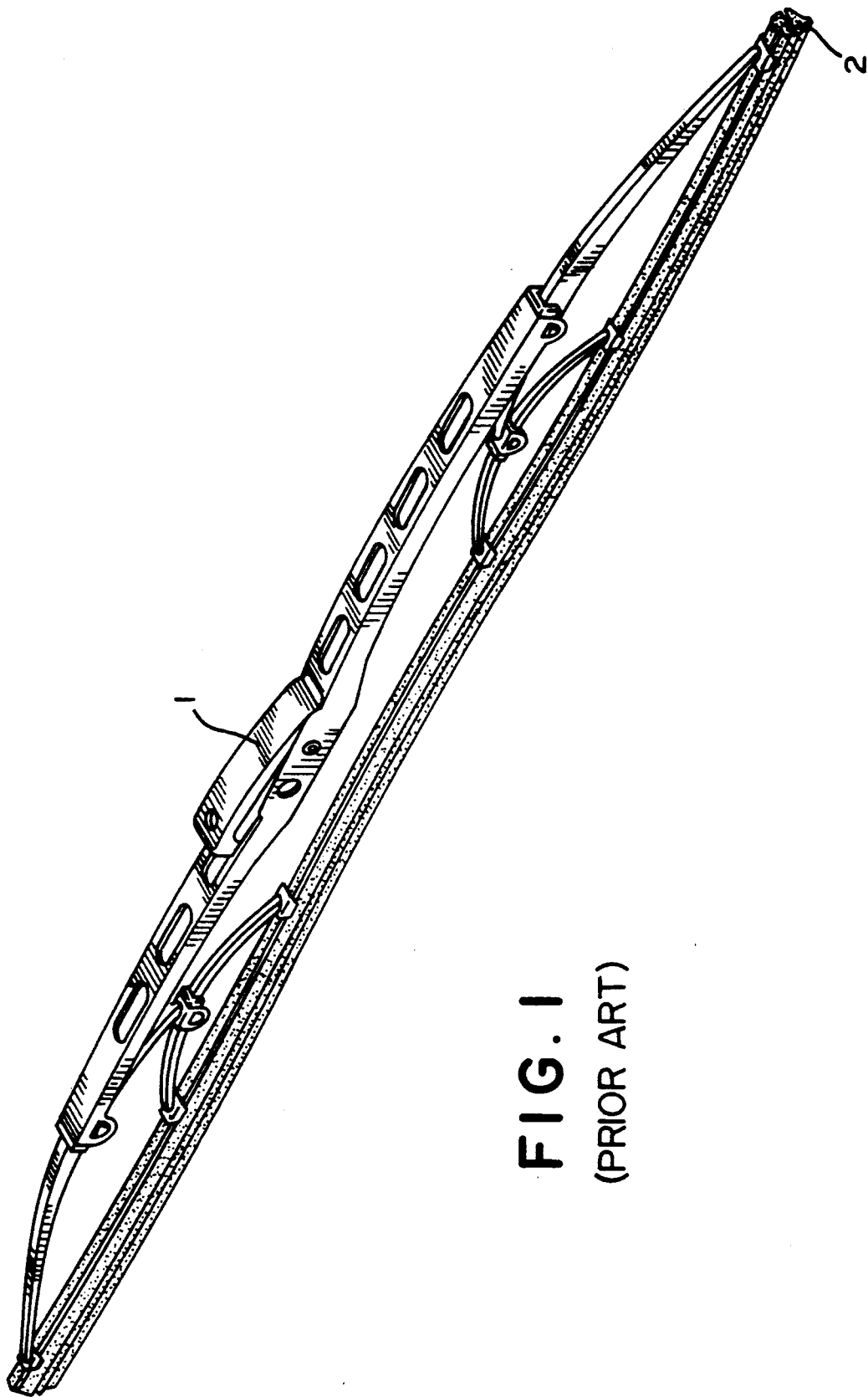
FIG. 1 is a perspective view of the conventional windshield wiper.
Figure 2:
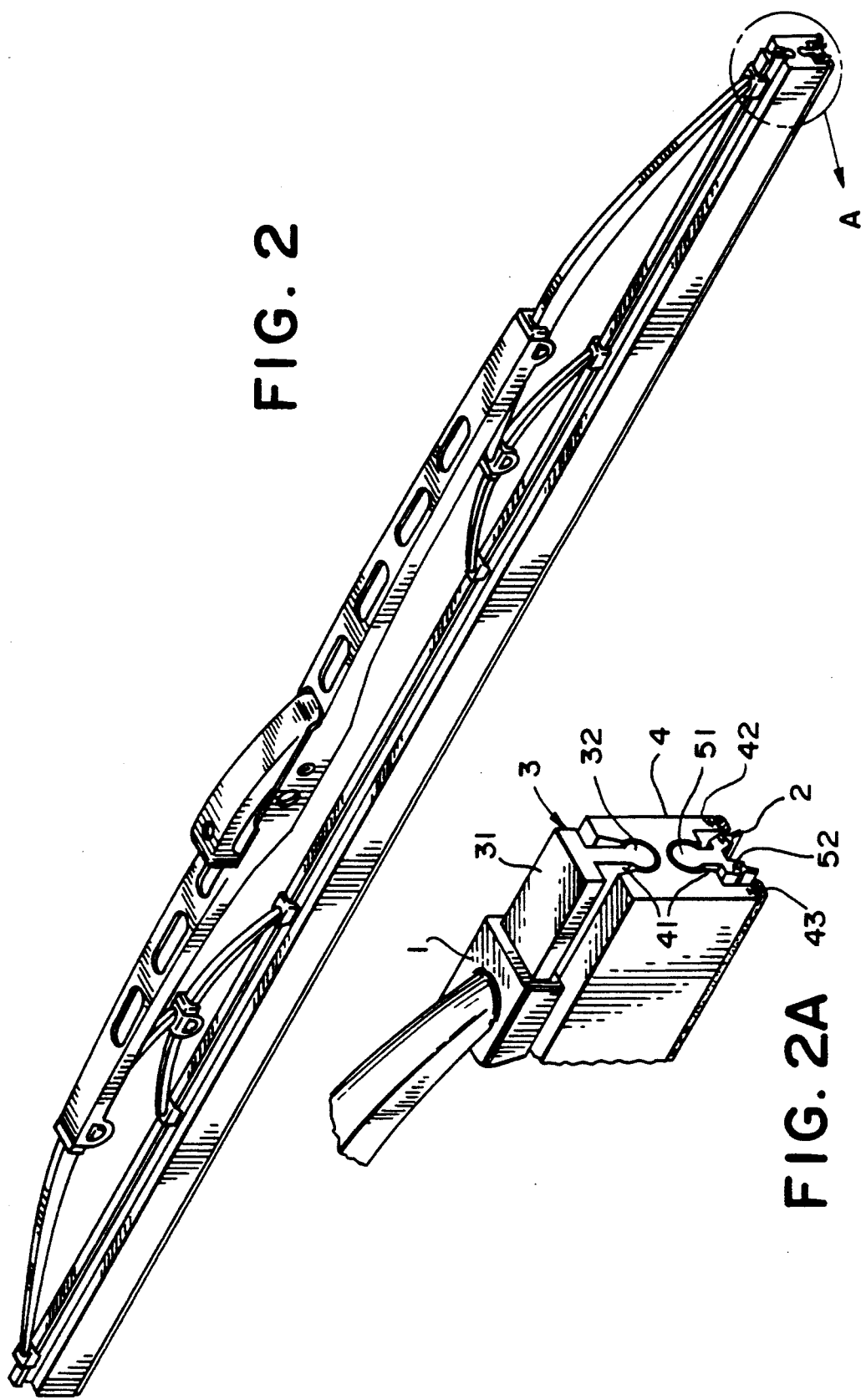
FIG. 2 is a perspective view of the present invention.
Figure 3:
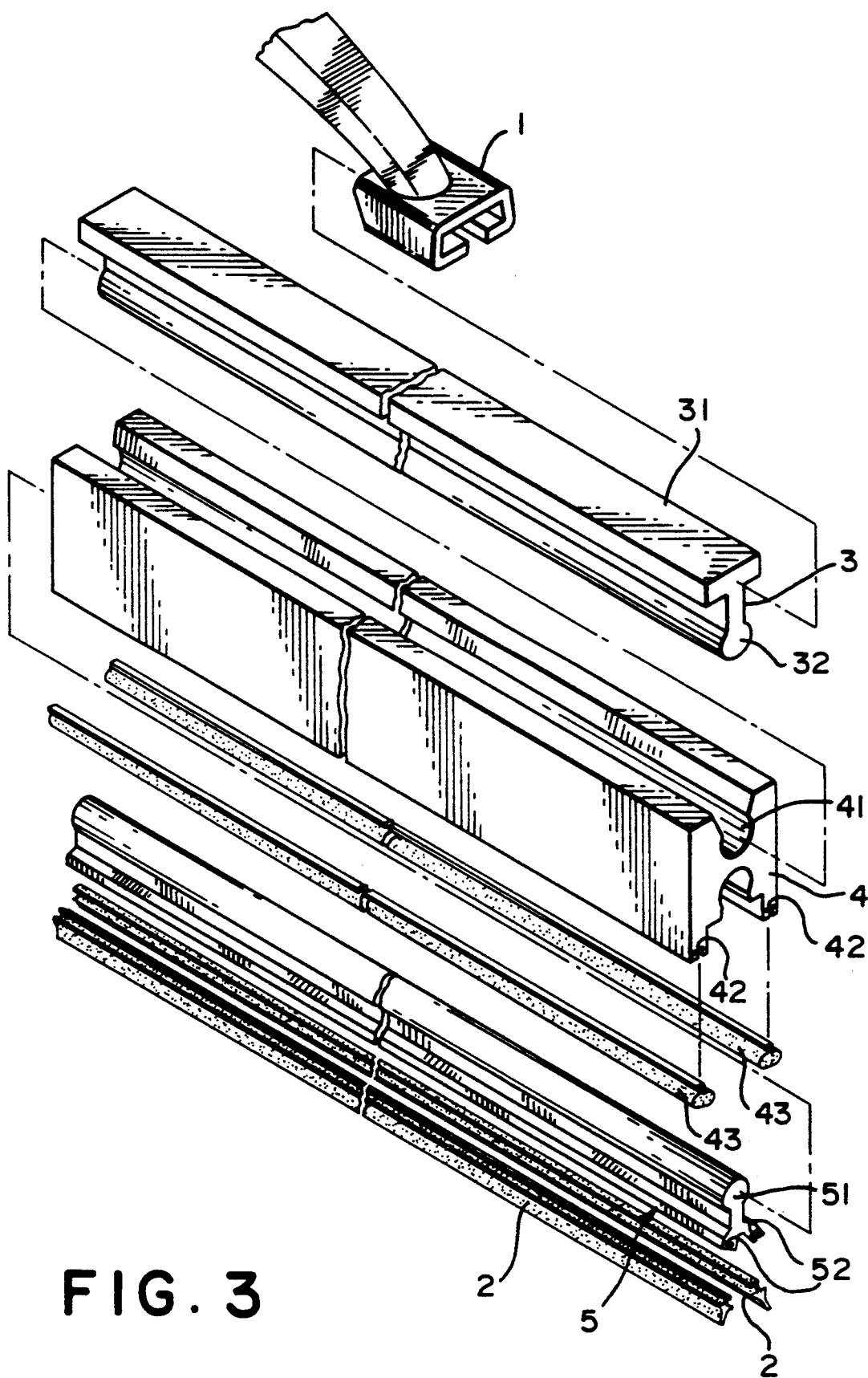
FIG. 3 is a perspective view showing the disassembled structure of the present invention.

Please refer to FIGS. 2, 3, and 4. The present invention is an auto-cleansing wiper which has a double-blade wiper mechanism capable of automatically alternating the blade for wiping and self-cleansing. It is formed with a wiper arm (1) and a distinctively designed automatic alternating device provided with a motivating shaft (3), a connecting seat (4), and a double-groove blade seat (5). The motivating shaft (3) is a shaft structure which, viewing from the cross section, includes a T-shaped rail piece (31) on the upper edge for joining to the holder of the wiper arm (1) and a round bar (32) on the lower edge for inserting into the connecting seat (4). The connecting seat (4) is a track-like structure which, in cross section, is formed into an H-shaped open dovetail including a round groove (41) on both its upper edge and lower edge to join to the round bar (32) of the motivating shaft (3) from the top and to the top edge of the double-groove blade seat from the bottom. Furthermore, at both ends of the dovetail groove at the bottom of the seat (4), there are provided a pair of receiving grooves (42) for receiving the brush-like strip cleaner (43) which can be supplied with detergent for cleansing the wiper blade; the double-groove blade seat (5) is a bar structure which, viewing from the cross section, is formed as a tower with a ball-edged bar (51) on the top for joining to the dovetail round groove (41) at the bottom of the connecting seat (4) as well as a pair of holding grooves (52) at the bottom for holding two blades. The pair of the holding grooves (52) are positioned as open arms to a certain degree so that the blades attached therewith can have a certain distance between each other for alternation.

To assembly the present invention, it is first required to place the T-rail piece (31) of the motivating shaft (3) into the holder of the wiper arm (1), and join the round bar (32) to the dovetail round groove (41) formed on the top part of the connecting seat (4) to be transversely movable as a ball joint; next, the other dovetail round groove (41) formed at the bottom of the connecting seat (4) is inserted with the ball-edged bar (51) formed on top of the double-groove blade seat (5) to be as well transversely movable by such ball joint; thereafter, two wiper blades (2) are attached respectively to the pair of holding grooves (52) formed at the bottom of the blade seat (5).

As the wiper of the present invention is in practice, the auto-alternating device will be carried by the wiper arm (1) moving in its direction, as shown in FIG. 5, and force the motivating shaft (3) to push the connecting seat (4) and thereby motivate the double-groove blade seat (5). Meanwhile, the conical surface of the dovetail round groove (41) on the top part of the connecting seat (4) is approached against the vertical surface of the T-rail piece of the motivating shaft (3), so that the connecting seat (4) is inclined to a certain degree in accordance with the inclination of the conical surface and the moving direction; likewise, the ball-edged bar (51) of the blade seat (5) is inclined to the moving direction with a certain degree in accordance with the inclination of the connecting seat, so that one of the two blades (2) opened with certain degree is vertical to the windshield for wiping and the second blade (2) is engaged against the conical surface of the dovetail round groove (41) at the bottom of the connecting seat (4). As the second wiper blade (2) is alternated for wiping, it will first pass and be brushed by the strip cleaner (43) attached at the end of the connecting seat (4). When the wiping direction is changed to the contrary, the auto-alternating device as mentioned above enables the first wiper blade to raise up to a certain degree and be cleaned by the strip cleaner on the other side of the connecting seat (4) and the second blade (2) is accordingly positioned vertically for wiping as shown in FIG. 6.

With the repeated wiping and cleansing alternating motion, the wiper blades can be kept constantly clean and perform the best wiping effect.

It is therefore to be understood that the main object of the present invention is to provide an auto-alternating wiper with a simple and concise structure which can maintain the wiper constantly clean for the best wiping effect.

It is the second object of the present invention to provide a windshield wiper with the distinctively designed auto-alternating wiping and cleansing device so that the wiper been kept constantly clean can extend its duration for application

I claim:

1. An automatic self-cleaning windshield wiper assembly comprising:
   a) a wiper arm;
   b) a motivating shaft carried by the wiper arm, the shaft including a cross-sectional configuration defined by a T-shaped portion and a round portion extending from said T-shaped portion;
   c) a connecting seat having an H-shaped cross-sectional configuration defined by upper and lower dovetail-shaped round grooves, the round portion of the motivating shaft being pivotally engaged within the upper round groove, and a pair of receiving grooves formed at the bottom of the connecting seat on opposite sides of the lower round groove for receiving a pair of cleaner strips.
   d) a blade seat having a cross sectional configuration defined by a round portion and a pair of outwardly angled arms extending from said round portion, the round portion of the blade seat being pivotally engaged within the lower round groove of the connecting seat, and each arm including a groove receiving a wiper blade; and
   e) whereby when the wiper arm moves back and forth across the windshield, the pivotal engagements between the round portions of the motivating shaft and blade seat with the respective upper and lower round grooves of the connecting seats causes each wiper blade to be cleaned by one of the cleaner strips prior to their alternating engagement with the windshield for wiping same.

* * * * *